US005281962A

United States Patent [19]

Vanden Heuvel et al.

[11] Patent Number: 5,281,962

[45] Date of Patent: Jan. 25, 1994

[54] METHOD AND APPARATUS FOR AUTOMATIC GENERATION AND NOTIFICATION OF TAG INFORMATION CORRESPONDING TO A RECEIVED MESSAGE

[75] Inventors: Dean P. Vanden Heuvel, Chandler, Ariz.; Charles J. Ganucheau, Jr., Boynton Beach, Fla.

[73] Assignee: Motorola, Inc., Schaumburg, Ill.

[21] Appl. No.: 880,274

[22] Filed: May 8, 1992

[51] Int. Cl.[5] .......................... H04B 7/00; H04Q 7/04; G08B 5/22

[52] U.S. Cl. ............................ 340/825.44; 340/311.1; 340/825.27; 364/705.05

[58] Field of Search ...................... 340/825.44, 825.52, 340/311.1

[56] References Cited

U.S. PATENT DOCUMENTS

| | | | |
|---|---|---|---|
| 4,873,519 | 10/1989 | Matai et al. | 340/825.44 |
| 5,043,721 | 8/1991 | May | 340/825.44 |
| 5,049,874 | 9/1991 | Ishida et al. | 340/825.44 |

FOREIGN PATENT DOCUMENTS

| | | | |
|---|---|---|---|
| WO91/11889 | 8/1991 | World Int. Prop. O. | H04Q 7/00 |

*Primary Examiner*—Donald J. Yusko
*Assistant Examiner*—Edward Merz
*Attorney, Agent, or Firm*—Kelly A. Gardner; Daniel R. Collopy; Thomas G. Berry

[57] ABSTRACT

In a selective call receiver (110) for receiving selective call messages, a method for generation and notification of tag information comprises the steps of receiving (310) a selective call message and generating (345, 355) tag information in response to receiving the message. A further step includes providing (350) the tag information to an interface (250) for coupling to an exterior electronic device (410).

21 Claims, 4 Drawing Sheets

METHOD AND APPARATUS FOR AUTOMATIC GENERATION AND NOTIFICATION OF TAG INFORMATION CORRESPONDING TO A RECEIVED MESSAGE

FIELD OF THE INVENTION

This invention relates in general to selective call receivers, and more specifically to a method and apparatus for automatic generation and notification of identification information corresponding to a received message.

BACKGROUND OF THE INVENTION

Selective call messaging, such as paging messaging, involves transmitting a message or a page to an intended selective call receiver by radio frequency (RF) signals. The page is received from an originator at a selective call terminal and is encoded into a format recognizable by the selective call receiver. A selective call address assigned to the receiver is added to the message to indicate the intended selective call receiver. The message is then transmitted for reception within a selective call system coverage area in which the receiver is expected to be located.

Conventionally, pages are received by the selective call terminal from remote devices via telephones, in the case of voice and numeric messages, or data handlers, in the case of alphanumeric messages. In addition, some pages are originated from information supplied to video display terminals (VDTs) coupled directly to the selective call terminal. The formats of the signals received from the telephones, data handlers, and VDTs are known to the selective call terminal and are compatible with the formatting of the selective call signals into known signalling formats.

Pages sent from the data handler to the selective call terminal may originate from information service providers as well. Information service providers may provide database messages including financial data, news, sports or other generally distributed information. Each selective call receiver which is to receive database messages from an information service provider must recognize which database messages are authorized for reception by the selective call receiver. Initially, when the selective call receiver receives an RF signal, it must discriminate between personal messages and database messages sent by information service providers. Once this is accomplished, the selective call receiver determines whether or not the database message is one that the selective call receiver is authorized to receive. The personal messages and the authorized database messages are subsequently stored in memory.

Both database messages sent by information service providers and personal messages may be viewed by the user on a display device, such as a liquid crystal display (LCD), incorporated by the selective call receiver. Displaying a database on the LCD may become unwieldy, however, due to the typically long length of database information and the small size of the LCD. In such cases, conventional selective call receivers may be conveniently coupled to an external electronic device, such as a personal computer, having a larger display. The database may then be transmitted from the selective call receiver to the computer for subsequent viewing by the user.

Information service providers may provide large quantities of data in each database message, resulting in large internally stored databases within the selective call receiver. Transmitting the data to a computer can be time consuming, and, if several databases are transmitted at approximately the same time, the user may have to wait to read the database. The volume of data can be, and in most cases is, greater than a typical user can easily consume, even if the database is transmitted to an external electronic device for display on a large display device. For example, when a message updating a database is received by a selective call receiver, the user must often scroll through the entire database, whether it is displayed by the LCD or by an external electronic device, to read the updated portion. In this manner, the user may waste time by scrolling through an entire database before discovering that the changes made in the database are of no interest to him.

To aid the user in interpreting the data, some limited data processing features have been developed and incorporated in selective call receivers, although the features are severely limited by constraints on the space available for software within the selective call receiver. One such feature allows the user to scroll through the data and select a specific page of data within a database in which he is particularly interested. Thereafter, the selective call receiver will automatically present the selected page of data whenever the selected page is updated by a database message. Due to power consumption restrictions and software space constraints within the selective call receiver, however, the use of processing features can be so limited as to be of minimal assistance to the user.

Thus, what is needed is a method and apparatus for generating identifying information about messages and notifying an external processor having additional processing resources of the identifying information without overloading the interface therebetween with message transference.

SUMMARY OF THE INVENTION

According to a first aspect of this invention, a method for generation and notification of tag information in a selective call receiver comprises the steps of receiving a selective call message and generating tag information in response to receiving the message. A further step includes sending the tag information to an interface for coupling to an exterior electronic device.

According to a second aspect of this invention, a selective call receiver for receiving selective call messages comprises receiver means for receiving a selective call message, storage means coupled to the receiver means for storing message information included in the message, and generating means coupled to the receiver means for generating tag information in response to receiving the message. The selective call receiver further comprises an interface coupled to the generating means for coupling to an external electronic device and communication means coupled to the generating means for sending the tag information to the interface.

DESCRIPTION OF A PREFERRED EMBODIMENT

Figure 1:
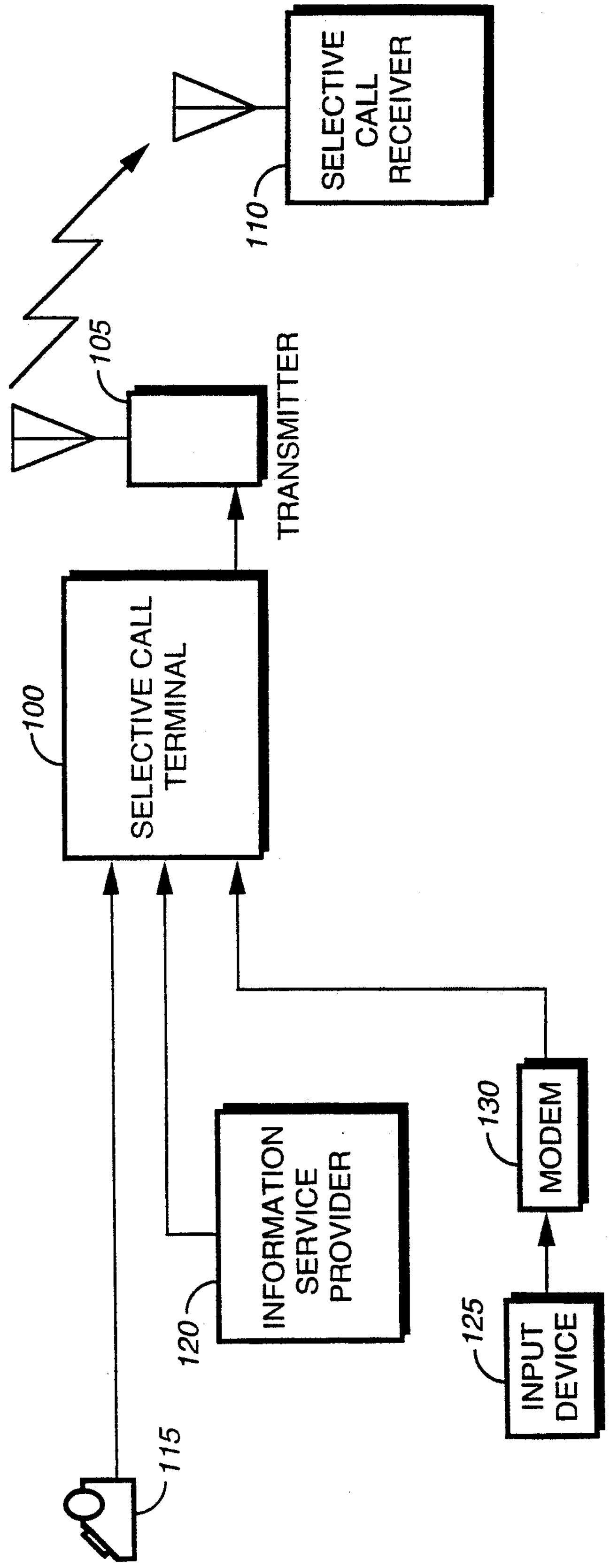
FIG. 1 is a block diagram of a selective call system in accordance with a preferred embodiment of the present invention.

Referring to FIG. 1, a selective call system, in accordance with a preferred embodiment of the present invention, comprises a selective call terminal 100 which provides selective call signals to a transmitter 105 for transmission to at least one selective call receiver 110. The selective call signals are selective call messages which have been encoded into radio frequency (RF) signals by the selective call terminal 100.

The information comprising the selective call messages may be numeric or voice information received from a telephone 115 via the public switched telephone network. Additionally, the information may be a numeric or alphanumeric database received from an information service provider 120. The information service provider 120 collects information on sports, stocks, world finance, and other areas of interest to the public and sends a database message, corresponding to the collected information, to the terminal 100. The database message sent by the information service provider typically comprises message information. e.g., an updated portion of a previously received complete database, and routing information that identifies a previously received database and a destination within the specified database wherein the message information is to be located. Finally, the information may be received from another input device 125, e.g. a personal computer or electronic mail service, via a modem 130 as alphanumeric or numeric information.

The information from the information service provider 120 and the other input devices 125 is provided to the selective call terminal 100 which formats and encodes the information into a signalling format suitable for broadcasting by the selective call terminal 100. The selective call terminal 100 provides the encoded information to a transmitter 105 for transmission therefrom.

The selective call receiver 110 receives the selective call signal and discriminates between personal messages, i.e., those not sent by an information service provider, and database messages sent by an information service provider. The selective call receiver 110 must recognize which database messages are authorized for reception by the selective call receiver 110 and reject unauthorized database messages. The personal messages and the database messages are then stored in a memory within the selective call receiver 110.

Figure 2:
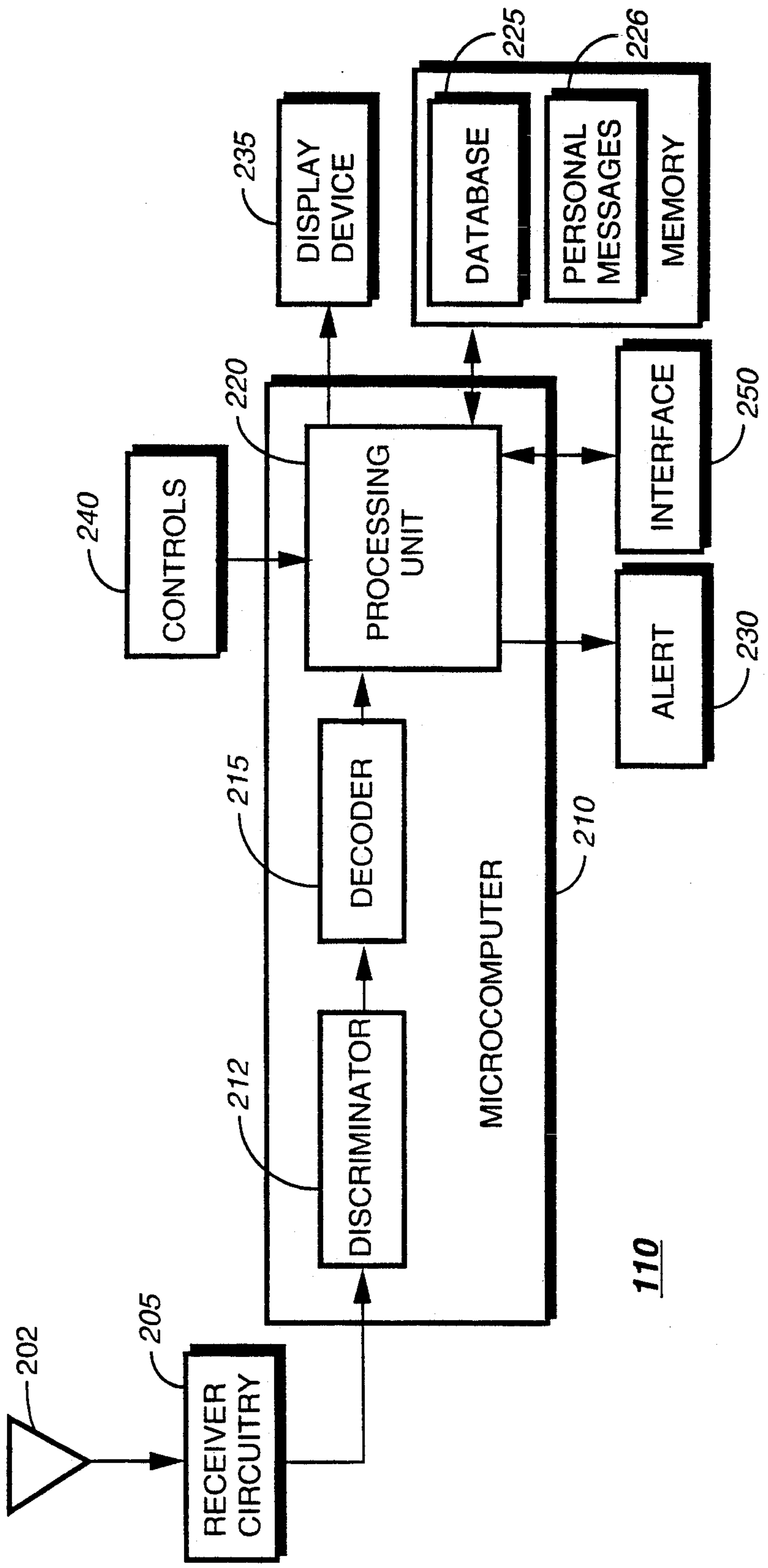
FIG. 2 is a block diagram of a selective call receiver in accordance with the preferred embodiment of the present invention.

Referring next to FIG. 2, a block diagram of the selective call receiver 110 in accordance with the present invention is depicted. The selective call receiver 110 comprises an antenna 202 for receiving a selective call message and receiver circuitry 205 coupled to the antenna 202 for demodulating the selective call message. A microcomputer 210 coupled to the receiver circuitry 205 comprises a discriminator 212 for determining the type of message, i.e., personal or database. If the message is a database message sent from an information service provider, the discriminator 212 determines whether or not the database message is one that the selective call receiver 110 is authorized to receive. Unauthorized database messages are thereafter rejected. Authorized database messages and personal messages are decoded by a decoder 215, which is internal to the microcomputer 210 and coupled to the discriminator 212, to recover message information included in both personal messages and database messages. If the message is a database message, the decoder 215 additionally decodes routing information included in the database message which identifies a destination within a specific database wherein the message information is to be located. The microcomputer 210 further comprises a processing unit 220 for processing the decoded message. The processing unit 220 stores the message information included in either type of message in the appropriate database memory 225 or personal message memory 226. In the case of personal messages, the processing unit 220 then sends a signal to an alert mechanism 230, in response to which the alert mechanism 230 may provide an alert to inform the user that a message has been received. If the message is to be presented by the selective call receiver 110, the processing unit 220 sends the message to a display device 235 incorporated by the selective call receiver 110. The message may be presented automatically or manually, when the processing unit 220 receives a signal from user actuated controls 240.

In operation, the processing unit 220 stores the message information included in a database message in a location indicated by the routing information. In this manner, the databases stored in the memory 225 are updated appropriately as each new database message is received. In addition, the processing unit 220, in accordance with the present invention, generates tag information in response to receiving a database message. The tag information is based on the routing information and comprises a database identification, indicating which database is to be updated, and a block number, indicating which portion of the targeted database is affected. The processing unit 220 subsequently sends the tag information to an interface 250 which may be interactively coupled to an external electronic device having additional processing resources.

Figure 3:
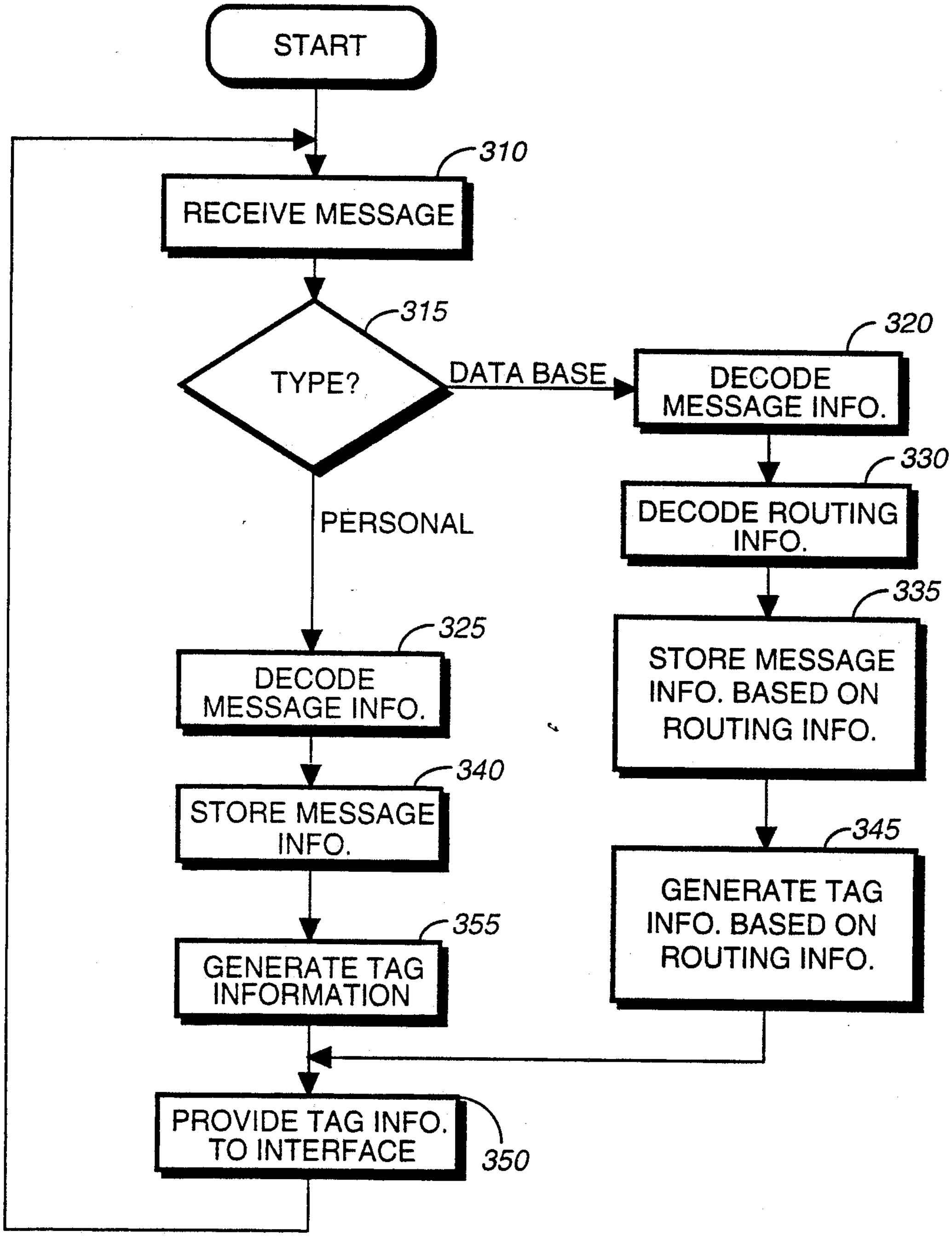
FIG. 3 is a flowchart of the operation of the microcomputer of FIG. 1 in accordance with the preferred embodiment of the present invention.

FIG. 3 is a flowchart illustrating the operation of the microcomputer 210 (FIG. 2), wherein tag information is generated in response to reception 310 of a selective call message. In accordance with the present invention, the discriminator 212 internal to the microcomputer 210 receives 310 the message and determines 315 the type of the received message, which may be a personal message or a database message sent by an information service provider. Thereafter, the decoder 215 (FIG. 2) recovers 320, 325 message information contained in the received message. If the received message is a database message, the received message additionally comprises routing information sent by the information service provider, in which case the decoder 215 decodes 330 the routing information. The decoded routing information includes a destination in a specified previously created database wherein the message information is to be placed. The processing unit 220 (FIG. 2) stores 335, 340 the message information regardless of the type of the received message. However, in the case of a database message, the routing information included in the database message is used to determine the location of the message information in the memory 225. The processing unit 220 further generates 345 tag information based on the routing information in response to receiving the database message. The tag information comprises a database identification, indicating which database is to be updated, and a block number, indicating which portion of the targeted database is affected. This tag information is then provided 350 to the selective call receiver interface 250 and processing returns to await reception 310 of a next selective call message.

In accordance with the present invention, the selective call receiver interface 250 (FIG. 2) may be coupled interactively to an external processor having additional processing capabilities. Conventionally, a selective call receiver is limited in the functions by which it may manipulate received data by microcomputer software space considerations. As a result, the user may not be able to easily utilize the large amounts of data that are typically present in database messages sent by an information service provider. The interactive coupling of the selective call receiver, especially in cases where large amounts of data are received by the selective call receiver, to the external processor allows the user to conveniently make use of the additional processing capability of the external processor. In this manner, the user may, for example, conveniently employ customized software, executed on the external processor, to monitor the received tag information, and, depending on the tag information, perform specific functions requested by the user.

In accordance with an alternate embodiment of the present invention, the processing unit 220 (FIG. 2) may also generate 355 tag information in response to the reception 310 of a personal message. In this case, the tag information might comprise information about the storage location of the message information included in the personal message or information including the address on which the personal message was received. The tag information could also be provided 350 to the selective call receiver interface 250 for subsequent transmission to an external processor. The external processor could, as with database messages, receive the tag information corresponding to the personal message and, depending on the tag information, perform user specified operations to assist the user of the selective call receiver.

Figure 4:
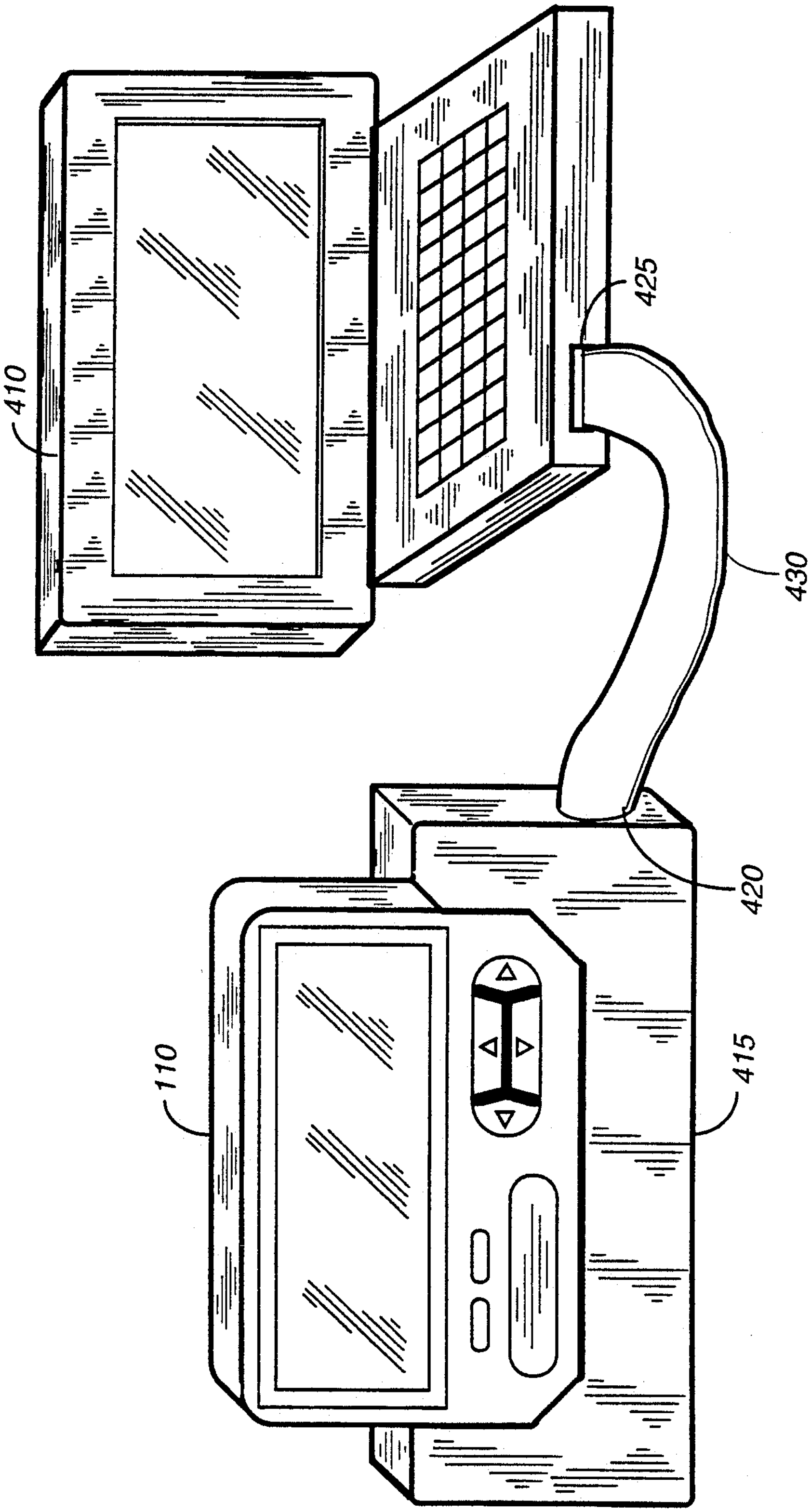
FIG. 4 is an illustration depicting a selective call receiver coupled interactively to an external electronic device in accordance with the preferred embodiment of the present invention.

FIG. 4 depicts the selective call receiver 110 interactively coupled to a personal computer 410 having additional processing resources. In accordance with the present invention, the selective call receiver 110 is placed in an interface unit 415 such that the selective call receiver interface 250 (FIG. 2) is connected to interface contacts, within the interface unit 415, which are coupled to a standard interface 420 located on the exterior of the interface unit 415. The standard unit interface 420 is connected to a standard interface 425 on the external processor 410 via an RS-232 interface connection 430, such as an RS-232 interface. When the selective call receiver 110 receives a database message from an information service provider, the processing unit 220 (FIG. 2) generates tag information, comprising database identification and a block number, which is sent to the selective call receiver interface 250. If the selective call receiver 110 is coupled, via the interface unit 415 and the RS-232 interface connection 430, to the external processor 410, the tag information is transmitted to the external processor 410. Because the external processor 410 may contain virtually unlimited resources for processing data as compared to the receiver, the user may employ these resources to aid in the interpretation of database messages sent from an information service provider. Software, customized by the user, can be executed on the external processor 410 to communicate with the selective call receiver 110 and respond to the tag information generated by the processing unit 220 (FIG. 2) internal to the selective call receiver 110.

Tag information transmitted by a selective call receiver allows an external processor to selectively respond to data base messages received by the selective call receiver. In some cases, for example, the incoming data messages may be received by the selective call receiver more rapidly than they can be transmitted to the external processor. In accordance with the present invention, the tag information can be generated and provided to the interface faster than providing the incoming data messages thereto. When the external processor detects tag information indicating an update of interest to the processor has been received by the selective call receiver, the external processor can retrieve the information of interest from the receiver and act thereon.

Several applications for this invention become immediately apparent. For example, software installed on an external processor could monitor a selected set of stock market volumes, trends, quotations, etc. Upon reception of tag information indicating that price updates concerning a particular stock have been received by the selective call receiver, the external processor could retrieve the updated database information to catalog the price information or to notify the user when the price reaches a specified level. Additionally, the monitoring of database parameters could trigger other event sequences, such as alerting a user when certain conditions occur. Thus, the present invention advantageously allows each user to monitor and manipulate incoming data in a manner that may be tailored to his specific business and personal needs.

By now it should be appreciated that there has been provided a method and apparatus for generating identifying information about messages and notifying an external processor having additional processing resources of the identifying information for use thereby.

We claim:

1. In a selective call receiver for receiving selective call messages and for storing database, a method for processing the selective call messages, the method comprising the steps of:

(a) receiving and decoding a selective call message to recover therefrom message information, wherein the message information is updated information intended for replacing at least a portion of one of the databases;

(b) generating, in response to reception of the selective call message, tag information indicative of the one of the databases to which the message information relates and indicative of the at least a portion of the one of the databases which is to be replaced; and (c) sending the tag information to an interface for coupling to an exterior electronic device.

2. The method in accordance with claim 1, further comprising the step of:

(d) storing the message information included in the selective call message in a memory.

3. The method in accordance with claim 2, wherein step (b) comprises the step of:

(e) generating the tag information based on routing information included in the selective call message.

4. The method in accordance with claim 3, wherein step (d) comprises the step of:

(f) storing the message information included in the selective call message in a memory location determined by the routing information included in the selective call message.

5. The method according to claim 1, wherein step (b) comprises the step of:

(g) generating, in response to reception of the selective call message, tag information comprising a database identification and a block number, wherein the database identification identifies the one of the databases to which the message information relates, and wherein the block number specifies the at least a portion of the one of the databases which is to be replaced.

6. In a selective call receiver for receiving selective call messages and for storing database, a method for processing the selective call messages, the method comprising the steps of:

(a) receiving and decoding a selective call message to recover message information therefrom;

(b) determining that the message information is updated information intended for replacing at least a portion of one of the databases;

(c) generating, in response to determining that the message information is updated information, tag information indicative of the one of the databases to which the message information relates and indicative of the at least a portion of the one of the databases which is to be replaced;

(d) storing the message information included in the selective call message in a memory; and (e) sending the tag information to an interface for coupling to an external electronic device.

7. The method according to claim 6, wherein step (c) comprises the step of:

(f) generating the tag information based on routing information included in the selective call message when the message information is determined to be updated information.

8. The method according to claim 7, wherein step (d) comprises the step of:

(g) storing the message information included in the selective call message in a memory location determined by the routing information included in the selective call message when the message information is determined to be updated information.

9. The method according to claim 6, wherein step (c) comprises the step of:

(h) generating, in response to determining that the message information is updated information, tag information comprising a database identification and a block number, wherein the data base identification is indicative of the one of the databases to which the message information relates, and wherein the block number is indicative of the at least a portion of the one of the databases which is to be replaced.

10. In a selective call receiver for receiving selective call message of different types, a method for processing the selective call messages, the method comprising the steps of:

(a) receiving and decoding a selective call message to recover message information therefrom;

(b) determining whether the message information comprises a personal message or a database message, wherein a data base message is defined as being updated information for replacing at least a portion of a stored complete database;

(c) generating tag information in response to receiving the selective call message when the message information included therein comprises a database message, wherein the tag information comprises a database identification indicative of the stored complete database to which the database message relates and further comprises a block number indicative of the at least a portion of the stored complete database which is to be replaced by the database message;

(d) storing the message information included in the selective call message in a memory;

(e) alerting the user that the selective call message has been received; and (f) sending the tag information to an interface for coupling to an external electronic device.

11. The method according to claim 10, wherein step (c) comprises the step of:

(g) generating the tag information based on routing information included in the selective call message.

12. The method according to claim 11, wherein step (d) comprises the step of:

(h) storing the message information included in the selective call message in a memory location determined by the routing information when the message information comprises a database message.

13. A selective call receiver for receiving selective call messages and for storing databases, the selective call receiver comprising:

receiver means for receiving and decoding a selective call message to recover therefrom message information comprising updated information for replacing at least a portion of a complete database;

storing means coupled to the receiver means for storing the message information included in the selective call message;

generating means coupled to the receiver means for generating tag information in response to receiving the selective call message, wherein the tag information indicates the complete database to which the message information relates and further indicates the at least a portion of the complete database which is to be replaced by the message information;

an interface coupled to the generating means for coupling to an external electronic device; and control means coupled to the generating means and the interface for providing the tag information to the interface after generation thereof.

14. The selective call receiver in accordance with claim 13, wherein:

the storing means stores the message information included in the selective call message in a memory location determined by routing information included in the selective call message; and wherein the generating means generates the tag information based on the routing information.

15. The selective call receiver in accordance with claim 13, further comprising determining means coupled to the receiver means and the generating means for determining that the message information comprises updated information relating to a database.

16. The selective call receiver in accordance with claim 15, wherein:

the storing means stores the message information included in the selective call message in a memory location determined by routing information included in the selective call message when the message information comprises updated information; and the generating means generates the tag information based on the routing information when the message information comprises updated information.

17. The selective call receiver in accordance with claim 13, wherein the tag information comprises a database identification indicative of the complete database and a block number indicative of the at least a portion of the complete database.

18. A selective call receiver for receiving selective call messages of different types and for storing databases, the selective call receiver comprising:

a receiver for receiving a selective call message;

a decoder for decoding the selective call message to recover therefrom message information;

a memory coupled to the receiver for storing the message information included in the selective call message;

processing means coupled to the receiver and the memory for determining whether the message information comprises updated information for replacing at least a portion of a complete database;

an interface coupled to the processing means for coupling to an external electronic device; and generating means for generating tag information in response to the processing means determining that the message information comprises updated information and for providing the tag information to the interface, wherein the tag information indicates the complete database to which the message information relates and further indicates the at least a portion of the complete database which is to be replaced.

19. The selective call receiver in accordance with claim 18, wherein:

the memory stores the message information included in the selective call message in a memory location determined by routing information included in the selective call message when the message information comprises updated information; and the processing means generates the tag information based on the routing information when the message information comprises updated information.

20. The selective call receiver in accordance with claim 18, further comprising alerting means coupled to the processing means for alerting a user when the selective call message has been received.

21. The selective call receiver in accordance with claim 18, wherein the tag information comprises a database identification indicative of the complete database and a block number indicative of the at least a portion of the complete database.

* * * * *